United States Patent
Drane

(10) Patent No.: US 9,959,091 B2
(45) Date of Patent: May 1, 2018

(54) EVALUATION OF POLYNOMIALS WITH FLOATING-POINT COMPONENTS

(71) Applicant: Imagination Technologies Limited, Kings Langley (GB)

(72) Inventor: Theo Alan Drane, London (GB)

(73) Assignee: Imagination Technologies Limited, Kings Langley (GB)

( * ) Notice: Subject to any disclaimer, the term of this patent is extended or adjusted under 35 U.S.C. 154(b) by 143 days.

(21) Appl. No.: 14/847,788

(22) Filed: Sep. 8, 2015

(65) Prior Publication Data

US 2016/0070537 A1  Mar. 10, 2016

(30) Foreign Application Priority Data

Sep. 8, 2014 (GB) .................................. 1415816.6

(51) Int. Cl.
| | |
|---|---|
| *G06F 7/48* | (2006.01) |
| *G06F 7/483* | (2006.01) |
| *G06F 7/556* | (2006.01) |
| *G06F 7/552* | (2006.01) |

(52) U.S. Cl.
CPC .............. *G06F 7/483* (2013.01); *G06F 7/552* (2013.01); *G06F 7/556* (2013.01); *G06F 2207/5523* (2013.01)

(58) Field of Classification Search
CPC .......... G06F 7/483; G06F 7/552; G06F 7/556; G06F 2207/5523
USPC ................................................. 708/270–277
See application file for complete search history.

(56) References Cited

U.S. PATENT DOCUMENTS

| | | | | | |
|---|---|---|---|---|---|
| 5,463,574 A | * | 10/1995 | Desrosiers | .............. | G06F 7/556 708/495 |
| 5,646,876 A | * | 7/1997 | Smith | ..................... | G06F 7/552 708/490 |
| 8,332,446 B1 | * | 12/2012 | Everest | ................... | G06F 7/544 708/203 |
| 8,949,298 B1 | * | 2/2015 | Langhammer | .......... | G06F 7/552 708/200 |
| 2012/0130659 A1 | * | 5/2012 | Chaves | ................... | H03M 7/30 702/62 |

OTHER PUBLICATIONS

James Demmel et al., Toward Accurate Polynomial Evaluation in Rounded Arithmetic, Nov. 1, 2005.*

(Continued)

*Primary Examiner* — Michael D. Yaary
(74) *Attorney, Agent, or Firm* — Vorys, Sater, Seymour and Pease LLP; Vincent M DeLuca

(57) ABSTRACT

A method identifies a floating point implementation of a polynomial that is accurately evaluable. The method comprises determining whether the polynomial has an allowable variety defined by a plurality of sub-varieties, and, if so, partitioning the input domain of the polynomial into a plurality of sub-domains about the sub-varieties. A floating point precision is then identified for each input to the polynomial falling within each sub-domain based on the location of the input within the sub-domain (e.g. how far away the input is from the sub-variety associated with the sub-domain). A floating point implementation for the polynomial is generated so that an input to the polynomial is evaluated using floating point components having the precision identified for the input.

19 Claims, 9 Drawing Sheets

(56) References Cited

OTHER PUBLICATIONS

Hoffmann et al "Residual iteration and accurate polynomial evaluation for shape-interrogation applications. In Proceedings of the ninth ACM symposium on Solid modeling and applications", SM '04, pp. 9-14, Aire-la-Ville, Switzerland, Switzerland, 2004. Eurographics Association.

Hoffmann et al "Towards implementing robust geometric computations" In Proceedings of the fourth annual symposium on Computational geometry, SCG '88, pp. 106-117, New York, NY, USA, 1988. ACM.

IEEE Standard for Binary Floating-Point Arithmetic. ANSI/IEEE Std 754-1985, 1985.

Knuth "The Art of Computer Programming" vol. 2. Addison-Wesley, Reading, MA, 3rd edition, section 4.2, 1998.

Dekker "A floating-point technique for extending the available precision" Numerische Mathematik, 18(3)224-242, 1971.

Fousse et al "A comparison of polynomial evaluation schemes" Research Report MPI-I-2004-1-005, Max-Planck-Institut fur Informatik, Saarbrucken, Germany, Jun. 2004.

Graillat et al. "Improving the compensated Horner scheme with a fused multiply and add" In H Haddad, editor, SAC, pp. 1323-1327. ACM, 2006.

Graillat et al. "Algorithms for accurate, validated and fast polynomial evaluation" Japan Journal of Industrial and Applied Mathematics, 26(2):191-214, 2009.

Sutin "Accurate Evaluation of Polynomials". http://arxiv.org/abs/0805.3194, May 2008.

De Dinechin et al "Optimizing polynomials for floating point implementation" Computing Research Repository, 2008.

Martel "Enhancing the implementation of mathematical formulas for fixed-point and floating-point arithmetics" Form. Methods Syst. Des., 35(3):265-278, 2009.

Manocha "Error analysis for polynomial evaluation" http://www.cs.unc.edu/~smp/COMP205/LECTURES/ERROR/lec4.ps.

Demmel et al "Accurate and Efficient Expression Evaluation and Linear Algebra" Computing Research Repository, 2007.

Demmel et al "Toward accurate polynomial evaluation in rounded arithmetic (short report)" In Algebraic and Numerical Algorithms and Computer-assisted Proofs, 2005.

Demmel et al "Toward accurate polynomial evaluation in rounded arithmetic" Computing Research Repository, 2005.

Synopsys. DesignWare version 2013.03-SP1. 2013. http://www.synopsys.com/dw/buildingblock.php.

* cited by examiner

EVALUATION OF POLYNOMIALS WITH FLOATING-POINT COMPONENTS

BACKGROUND

As is known to those of skill in the art, a polynomial is a mathematical expression comprising one or more terms, each of which consists of a constant multiplied by one or more variables raised to a non-negative integer exponent (e.g. $a+bx+cx^2$, where a, b and c are the constants and x is the variable).

Polynomials are very common as they can be used to calculate a variety of values and/or model certain behavior. For example, a point $(a_1, a_2, a_3)$ 102 is determined to be on one side of a triangle 104 defined by three points $(0,0,0)$, $(b_1, b_2, b_3)$, and $(c_1, c_2, c_3)$ as shown in FIG. 1$a$ if equation (1) below is true:

$$a_1 b_2 c_3 - a_1 b_3 c_2 - a_2 b_1 c_3 + a_2 b_3 c_1 + a_3 b_1 c_2 - a_3 b_2 c_1 \geq 0 \quad (1)$$

In another example, a line passing through the point $(0,0,0)$ and $(v_1, v_2, v_3)$ 106 is determined to pass through a sphere 108 defined by a radius r and centre $(c_1, c_2, c_3)$, as shown in FIG. 1$b$, if equation (2) is true:

$$(v_1 c_1 + v_2 c_2 + v_3 c_3)^2 - (v_1^2 + v_2^2 + v_3^2)(c_1^2 + c_2^2 + c_3^2 - r^2) \geq 0 \quad (2)$$

When a polynomial is evaluated in hardware it may be evaluated using fixed point or floating point number representations. As is known to those skilled in the art a fixed point number representation is a representation of a number that has a fixed number of digits after the radix point (e.g. decimal point or binary point). In contrast, a floating point number representation of a number is a representation of a number where the radix point is not fixed (i.e. it can "float"). In other words the radix point can be placed anywhere within the representation.

The most common floating point standard is the Institute of Electrical and Electronics Engineers (IEEE) standard for floating-point arithmetic (IEEE-754). IEEE-754 specifies that floating point numbers are represented by three numbers: sign, exponent and mantissa (s, exp, mant). In general the three numbers (s, exp, mant) are interpreted, for a fixed integer bias, as shown in equation (3):

$$(-1)^s 2^{exp-bias} 1.mant \quad (3)$$

IEEE-754 defines the four basic formats shown in Table 1 for floating point numbers with varying degrees of precision. In particular, they are encoded with 16, 32, 64 and 128 bits respectively.

TABLE 1

| Type | Name | Sign Width | Exponent Width (ew) | Mantissa Width (mw) | Bias $2^{ew-1} - 1$ | Roundoff Error (u) |
|---|---|---|---|---|---|---|
| Half | F16 | 1 | 5 | 10 | 15 | $2^{-11}$ |
| Single | F32 | 1 | 8 | 23 | 127 | $2^{-24}$ |
| Double | F64 | 1 | 11 | 52 | 1023 | $2^{-53}$ |
| Quad | F128 | 1 | 15 | 112 | 16383 | $2^{-113}$ |

Floating point representations allow a greater range of numbers for the same number of bits (compared to fixed point number). Accordingly, both very large integers and small fractional numbers can be represented using floating point representations. However, since floating point numbers only have a limited number of bits they are prone to rounding errors. In particular, if the binary width of the exponent and mantissa are ew and mw respectively the number of bits of precision or significant bits is mw+1 (the floating point format has an implied bit of precision). The round off error u is half the distance between 1 and the next representable floating point value.

This rounding error inherent in floating point numbers means that performing arithmetic operations (e.g. evaluating polynomials) using floating point representations of the numbers (referred to herein as floating point arithmetic) does not always following standard real number arithmetic rules. For example, (4) illustrates some of the problems with floating point arithmetic, where "^" above an operation (e.g. $\hat{x}, \hat{+}, \hat{\div}$) denotes a floating point operation:

$$a \hat{+} 0 \neq a$$

$$a \hat{+} (b \hat{+} c) \neq (a \hat{+} b) \hat{+} c$$

$$a \hat{\times} (b \hat{\times} c) \neq (a \hat{\times} b) \hat{\times} c$$

$$a \hat{\times} (b \hat{+} c) \neq (a \hat{\times} b) \hat{+} (a \hat{\times} c)$$

$$a \hat{\times} (1 \hat{\div} a) \neq 1$$

$$a \hat{\times} (b \hat{+} c) \neq (a \hat{\times} b) \hat{+} (a \hat{\times} c)$$

$$a \hat{\times} b = 0 \not\Rightarrow a = 0 \text{ or } b = 0 \quad (4)$$

Accordingly floating point arithmetic is prone to error and adding more precision (e.g. bits to the floating point representation) does not always solve the problem. For example, consider a floating point implementation of the polynomial shown in equation (5):

$$(((333.75 b^6 + a^2(11 a^2 b^2 - 121 b^4 - 2)) + 5.5 b^8) - a^2 b^6) + \frac{a}{2b} \quad (5)$$

with the inputs a=77617 and b=33096. If the IEEE-754 single floating point representation (F32) is used (i.e. ew=8 and mw=23) the result is 1.17260361 . . . ; and if the IEEE-754 double floating point representation (F64) is used (i.e. ew=11 and mw=52) the result is 1.7260394005 317847 . . . , despite the fact that the correct answer is -0.827396.

However, in certain situations evaluation of a polynomial using floating point arithmetic is required. Accordingly, there is a desire to be able to accurately evaluate polynomials using floating point arithmetic.

The embodiments described below are provided by way of example only and are not limiting of implementations which solve any or all of the disadvantages of known systems and method for evaluating polynomials using floating point components.

SUMMARY

This summary provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Described herein are methods and systems for identifying a floating point implementation of a polynomial that is accurately evaluable. The method comprises determining whether the polynomial has an allowable variety defined by a plurality of sub-varieties, and, if so, partitioning the input domain of the polynomial into a plurality of sub-domains about the sub-varieties. A floating point precision is then identified for each input to the polynomial falling within each sub-domain based on the location of the input within the sub-domain (e.g. how far away the input is from the sub-variety associated with the sub-domain). A floating point implementation for the polynomial is generated so that an input to the polynomial is evaluated using floating point components having the precision identified for the input.

A first aspect provides a method of generating a floating point implementation of a polynomial. The method includes determining whether the polynomial has an allowable variety defined by one or more sub-varieties. In response to determining the polynomial has an allowable variety, an input domain of the polynomial is partitioned into a plurality of sub-domains about the sub-varieties and each sub-domain is associated with one of the sub-varieties. A precision of floating point components for each input to the polynomial falling in each sub-domain is identified based on a location of the input within the sub-domain. A floating point implementation comprising hardware logic is generated to evaluate the polynomial for an input to the polynomial using floating point components having the precision identified for the input.

A second aspect provides a system to generate a floating point implementation of a polynomial. The system includes an input module to receive the polynomial. The system also includes an assessment module to determine whether the polynomial has an allowable variety defined by sub-varieties and, in response to determining the polynomial has an allowable variety, the assessment module partitions an input domain of the polynomial into sub-domains about the sub-varieties. Each sub-domain is associated with one of the sub-varieties. The assessment module also identifies a precision of floating point components for each input to the polynomial falling in each sub-domain based on a location of the input within the sub-domain. An output module outputs a floating point implementation comprising hardware logic to evaluate the polynomial for an input to the polynomial using floating point components having the precision identified for the input.

A third aspect provides a computer readable storage medium having encoded thereon computer readable program code for generating the system of the second aspect.

A fourth aspect provides a computer readable storage medium having encoded thereon computer readable program code for causing a computer to perform the method of the first aspect.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1A:
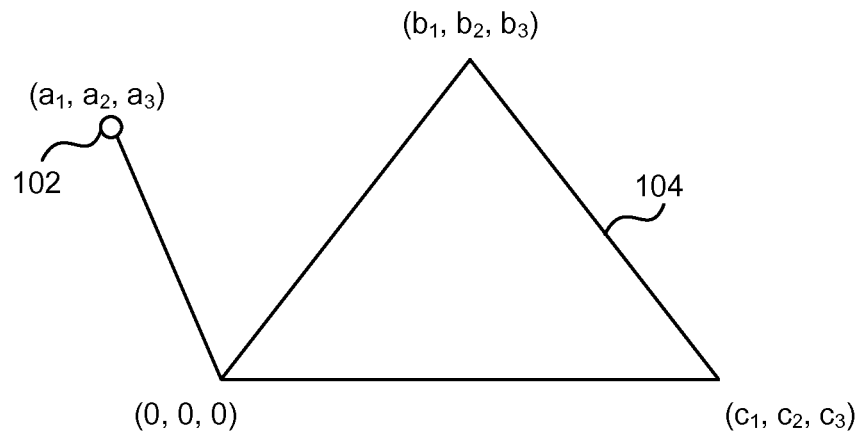
FIG. 1a is a schematic diagram of a triangle defined by three three-dimensional points.
Figure 1B:
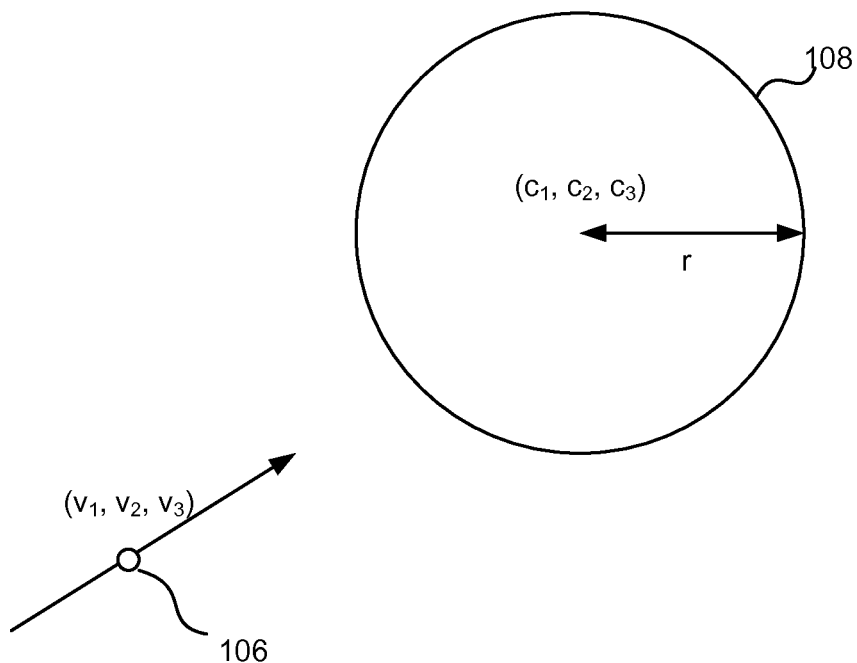
FIG. 1b is a schematic diagram of a circle defined by a radius and a three-dimensional centre point.

Common reference numerals are used throughout the figures to indicate similar features.

DETAILED DESCRIPTION

Embodiments of the present invention are described below by way of example only. These examples represent some ways of putting various configurations of the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

Described herein are methods and systems for generating a floating point implementation of a polynomial that allows for accurate evaluation of the polynomial. A floating point implementation is said to accurately evaluate the polynomial if it has a bounded relative error of strictly less than one. The methods and systems described herein are based on the principle that more precision is required when the input is closer to a zero condition of the polynomial and less precision is required when the input is further from a non-zero condition. Accordingly, the example methods and systems described herein generate a floating point implementation that comprises hardware logic that is configured to select the terms and precision of the floating point components to accurately evaluate the polynomial based on the proximity of the input to the zero conditions.

All of, a part of, the floating point implementation may then be built in hardware (e.g. it may be synthesized into silicon).

As described above, floating point implementations of a polynomial are prone to error due to the rounding nature of floating point representations and computations. If p is the real infinitely precise polynomial and $\hat{p}$ is the floating point implementation of the polynomial the relative error of the floating point implementation is as shown in equation (6):

$$\left| \frac{\hat{p} - p}{p} \right| \tag{6}$$

There are countless algorithms in computer aided geometric design which involve intersections, distance function and curvature extreme polynomial calculations (e.g. calculations of equations (1) or (2)) which require correctly determining the sign of a polynomial. In particular, determining the sign wrong can result in gross errors or catastrophic failure in geometric calculation. To ensure the sign is correct the relative error of a floating point implementation of a polynomial must be less than one as shown in equation (7):

$$\left|\frac{\hat{p}-p}{p}\right| < 1 \qquad (7)$$

If a relative error of greater than one were permitted as shown in equation (8):

$$\left|\frac{\hat{p}-p}{p}\right| \leq 1+\varepsilon, \varepsilon > 0 \qquad (8)$$

then it would be possible for $\hat{p}=-\epsilon p$ thus $\hat{p}$ would not be guaranteed to get the sign right.

Furthermore, since the cost of a floating point implementation of a polynomial is orders of magnitude greater than a fixed-point implementation the use of increased precision to gain greater accuracy can degrade performance in both time and power consumption. Accordingly it is desirable for floating point implementations of polynomials to be accurate (i.e. have a relative bounded error of less than one) and only use the appropriate level of precision to achieve the accuracy.

Figure 2:
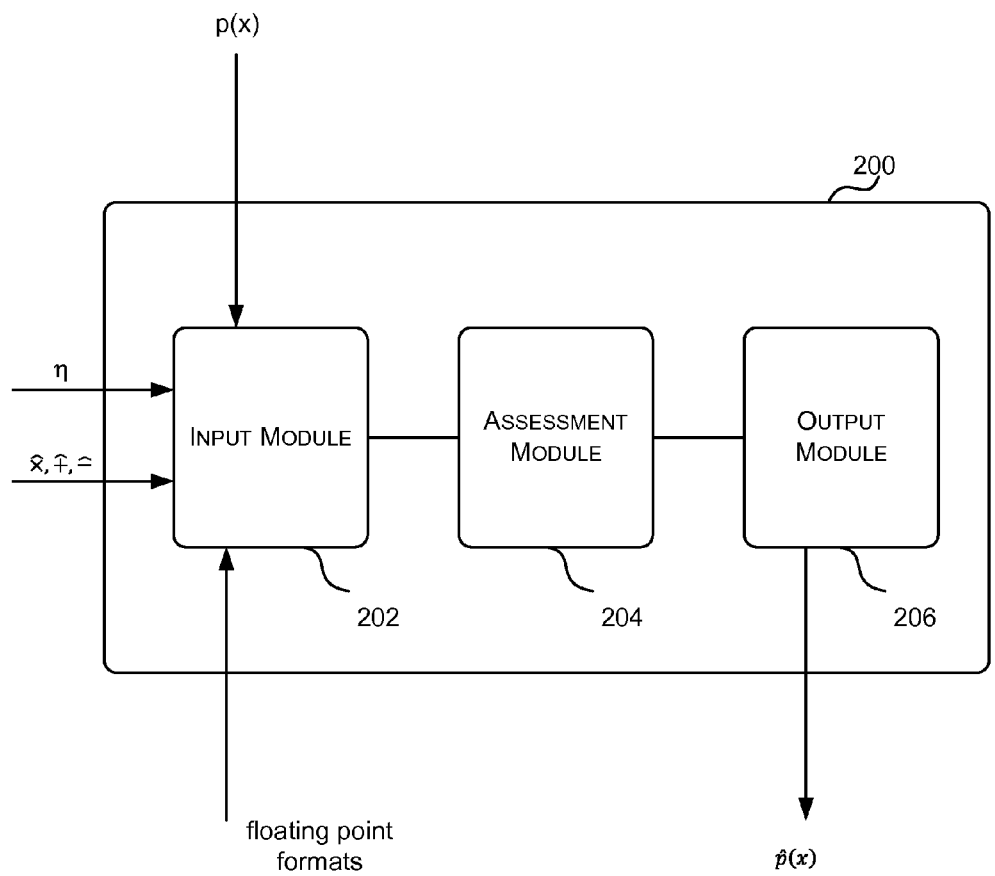
FIG. 2 is a block diagram of an example system for identifying a floating point implementation of a polynomial that allows accurate evaluation of the polynomial.

Reference is made to FIG. 2 which illustrates a system 200 for identifying a floating point implementation of a polynomial that allows accurate evaluation of a polynomial using the appropriate level of precision. The system comprises an input module 202, an assessment module 204 and an output module 206.

The input module 202 receives a polynomial p(x) to be implemented in hardware using floating point components, the floating point formats (and precision thereof) available for implementing the polynomial, an absolute relative error bound η (e.g. one in some cases), and the floating point operations (e.g. $\hat{x}, \hat{+}, \hat{-}$) that are available to evaluate the polynomial.

The assessment module 204 determines whether there is an accurately evaluable floating point implementation of the input polynomial p(x) comprising one or more sub-varieties (i.e. zero conditions); and if it is determined that there is an accurately evaluable floating point implementation for the specified input polynomial p(x) the assessment module 204 divides the input domain of the polynomial into sub-domains around the sub-varieties and identifies the terms of the polynomial to be evaluated and the minimum floating point precision (based on the available precisions) that can be used to accurately evaluate the polynomial for inputs within each sub-domain.

In particular, each sub-domain is divided into one or more subsets based on proximity to the associated sub-variety (e.g. the input values within the sub-domain that are "far" from the sub-variety may form one subset and the input values within the sub-domain that are "close" to the sub-variety may be said to be outside the subset). The terms of the polynomial to be evaluated and the floating point precision for accurate evaluation of the polynomial are then identified for (i) inputs that fall within the subset (e.g. inputs that are far from the sub-variety); and (ii) for inputs that fall outside the subset (e.g. inputs that are close to the sub-variety). In general, when an input is far away from the sub-variety then the polynomial can be accurately evaluated using a lower precision basic implementation of the polynomial and when an input is close to the sub-variety then the polynomial can be accurately evaluated using a higher precision basic implementation of the dominant terms of the polynomial as it approaches the sub-variety.

An example method for generating a floating point implementation of a polynomial that allows accurate evaluation thereof is described with reference to FIG. 3.

The output module 206 outputs either an indication that the input polynomial p(x) cannot be accurately evaluated using the floating point components, or it outputs a floating point implementation of the polynomial $\hat{p}(x)$ which can be used to accurately evaluate the polynomial. The floating point implementation of the polynomial $\hat{p}(x)$ is configured to select the terms and precision to be used in evaluating the polynomial based on which sub-domain and subset thereof the input to the polynomial (e.g. $x_1, x_2, x_3 \ldots$) falls within.

Figure 3:
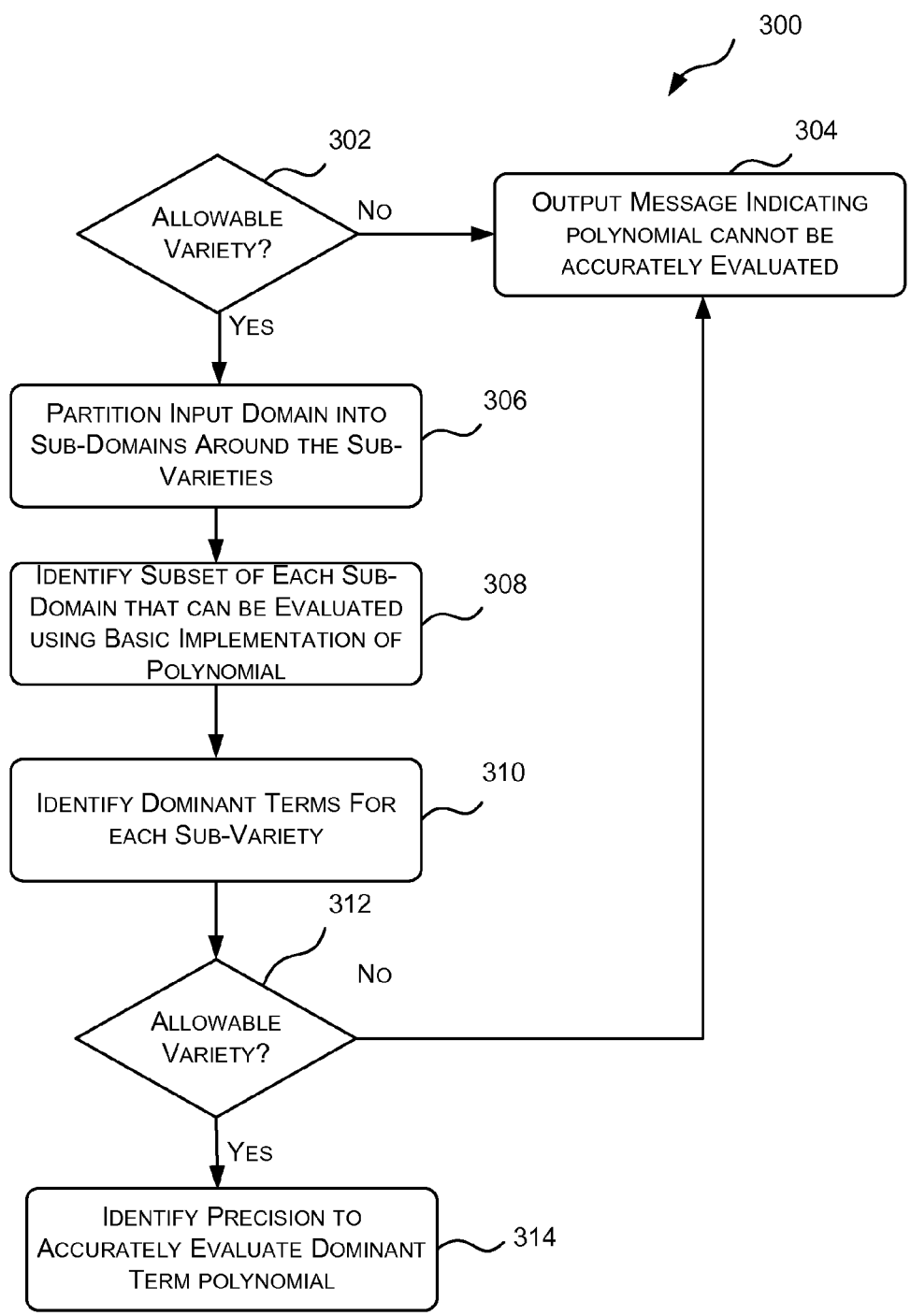
FIG. 3 is a flow chart of an example method for identifying a floating point implementation of a polynomial that allows accurate evaluation of the polynomial which may be implemented by the system of FIG. 2.

Reference is now made to FIG. 3 which illustrates a method 300 for generating a floating point implementation of a polynomial to achieve accurate evaluation of the polynomial which may be implemented by the assessment module 204 of FIG. 2. The method 300 begins at block 302 where the assessment module 204 determines whether the polynomial p(x) has an allowable variety. As described in more detail below a polynomial is said to have an allowable variety if there is a floating point implementation thereof in which the zeros can be determined correctly (i.e. when the floating point implementation of the polynomial is equal to zero, the corresponding real infinitely precise polynomial is also equal to zero and vice versa). In some cases a polynomial is considered to have an allowable variety if the conditions for the polynomial being zero (i.e. equality) can be written in the form $x_i=0$ or $x_j \pm x_k=0$. Each condition for the polynomial being zero is referred to herein as a sub-variety.

If the assessment module 204 determines that the polynomial does not have an allowable variety, then the method proceeds to block 304 where the output module 206 outputs an indication that the polynomial cannot be accurately evaluated using the specified floating point components. If, however, the assessment module 204 determines that the polynomial does have an allowable variety then the method 300 proceeds to block 306.

At block 306, the assessment module 204 divides the input domain into a plurality of sub-domains or regions. Each sub-domain or region is associated with a particular sub-variety. An input point (or set of input values) that falls within a particular sub-domain or region is closer to the associated sub-variety than any other sub-variety. In general, the closer an input point (or set of input values) is to a sub-variety (e.g. zero condition of the polynomial) the more precision is required.

Partitioning or dividing the input domain into a plurality of sub-domains or regions can be performed by mapping each sub-variety onto each possible plane formed by each possible pair of input values. Then on each plane constraints are created that separate a given sub-variety from all the other sub-varieties. The sub-domain for each sub-variety is then defined by the intersection of the constraints for that sub-variety.

Once the input domain has been divided into a sub-domain for each sub-variety, the method 300 proceeds to block 308.

At block 308, the assessment module 204 identifies, for each sub-variety, a subset within the sub-variety for which the polynomial can be accurately evaluated using a basic implementation of the polynomial. In particular, it is determined how far away from the sub-variety the input has to be to be able to accurately evaluate the polynomial using a basic floating point implementation of the polynomial.

A basic floating point implementation of a polynomial is a floating point implementation which operates on the expanded form of the polynomial and first computes the monomials using a left to right logarithm multiplication tree, then multiples by each coefficient. Finally a left to right logarithmic addition tree is performed.

As will be described in further detail below, a homogeneous polynomial p(x) of degree m and having s terms can be accurately evaluated using a basic floating point implementation with floating point components with a maximum relative accuracy $\delta$ on the domain D provided the following is true:

$$\frac{\sum_\alpha |c_\alpha|((1+\delta)^{m+\lceil log_2 s\rceil}-1)}{\min(p(x):\|x\|=1,\, x\in D)} < \eta$$

where D is the relevant sub-domain (formed by the constraints described above in reference to block 306) bounded away from the sub-variety by a constraint of the form $x_i^2 \ge e(x_1^2 + x_2^2 + \ldots + x_n^2)$ or $(x_i - x_j)^2 \ge e(x_1^2 + x_2^2 + \ldots + x_n^2)$.

A particular floating point operation will have a relative accuracy $\delta$. Thus for a known $\eta$ the minimum e that allows a particular floating point precision to be used can be determined for each floating point precision for each sub-variety/sub-domain from the above equation. This will produce a domain D (i.e. a subset of the sub-domain) for each particular floating point precision for each sub-variety.

Once the values of e have been determined for each floating point precision for each sub-variety it can be determined whether the input is "far enough" away from the sub-variety to evaluate the polynomial using a basic floating point implementation of the polynomial by determining if the input falls within one of the domains D (i.e. subsets of the sub-domains) defined by the calculated e values.

Once the subset (e.g. domain D) for each sub-domain has been identified the method 300 proceeds to block 310.

At block 310 the assessment module 204 determines, for each sub-variety, the dominant terms of the polynomial as the polynomial approaches the sub-variety. In some cases, determining the dominant terms of a polynomial as the input approaches a particular sub-variety comprises expanding the polynomial using the variables defining the sub-variety within a given subdomain. The dominant terms are then identified by computing the terms associated with the faces of the convex hull of a multi-dimensional Newton polytope. This process will be described in further detail below.

Once the dominant terms are identified they are combined to form what is referred to herein as a dominant term polynomial and then the method 300 proceeds to block 312.

At block 312, it is determined whether the dominant term polynomial has an allowable variety. As described above in reference to block 302 a polynomial is said to have an allowable variety if the conditions for the polynomial being zero (i.e. equality) can be written in the form $x_i=0$ or $x_j \pm x_k=0$. If it is determined that the dominant term polynomial has an allowable variety then the method proceeds to block 314. If, however, it is determined that the dominant term polynomial does not have an allowable variety then the method proceeds to block 304 where the output module outputs a message indicating the polynomial cannot be accurately evaluated using the floating point components (e.g. $\hat{\times}, \hat{+}, \hat{-}$)

At block 314, the precision for accurately evaluating the dominant term polynomial as a proxy for the actual polynomial is determined.

As will be described in more detail below, a dominant term polynomial can be used to accurately evaluate a polynomial near a particular sub-variety if the following is met:

$$\frac{\sum_\alpha |c_\alpha|((1+\delta)^{m+\lceil log_2 s\rceil}-1)}{\min(p(x):\|x\|=1,\, x\in D)} < \frac{\eta-\Delta}{1+\Delta}$$

where $\Delta$ is the relative error of the dominant term polynomial $p_{dom}$ and the polynomial. If $\Delta$ can be determined then the above equation can be solved to determine $\delta$ which indicates the level of precision needed to accurately evaluate the polynomial (via the dominant term polynomial) when it gets close to a particular sub-variety.

Once the precision required for accurately evaluating the polynomial via the dominant term polynomial has been determined, the method ends and the output module 206 outputs a floating point implementation that is configured to evaluate the polynomial using a basic implementation of the polynomial of a predetermined precision when the input to the polynomial falls within a subset of a sub-domain (e.g. the input is far from the sub-variety) and to evaluate the polynomial using the identified dominant term polynomial for a sub-variety when the input falls within the associated sub-domain, but outside any of the subsets (e.g. the input is close to the sub-variety).

The blocks of method 300 are now described in further detail below.

Determining Whether the Polynomial has an Allowable Variety

The first step in determining a floating point implementation of a polynomial that allows accurate evaluation thereof is determining whether the polynomial has an allowable variety. An allowable variety is a floating point implementation of the polynomial in which the zeros can be determined correctly. A floating point implementation of a polynomial is considered to determine the zeros correctly if when the floating point implementation of the polynomial $\hat{p}$ is equal to zero the corresponding real infinitely precise polynomial p is also equal to zero. This is represented by equation (9)

$$\hat{p}=0 \Leftrightarrow p=0 \qquad (9)$$

Figure 4A:
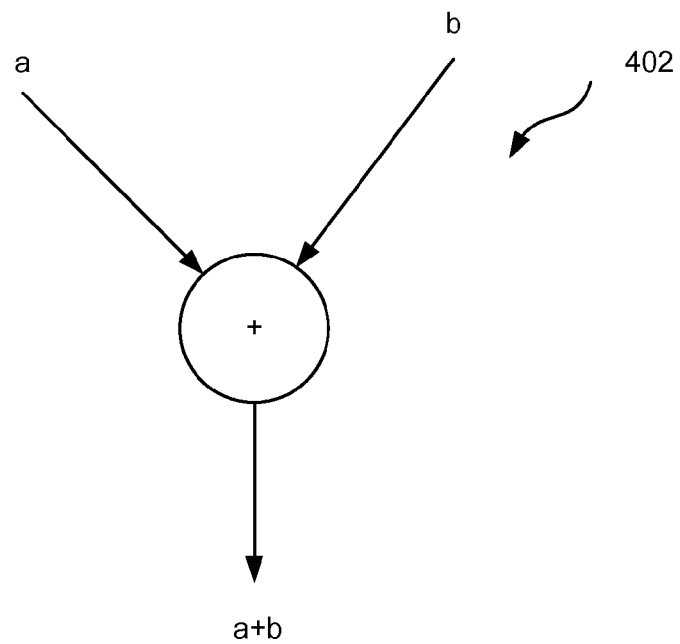
FIG. 4a is a schematic diagram of an example two-input floating-point adder.
Figure 4B:
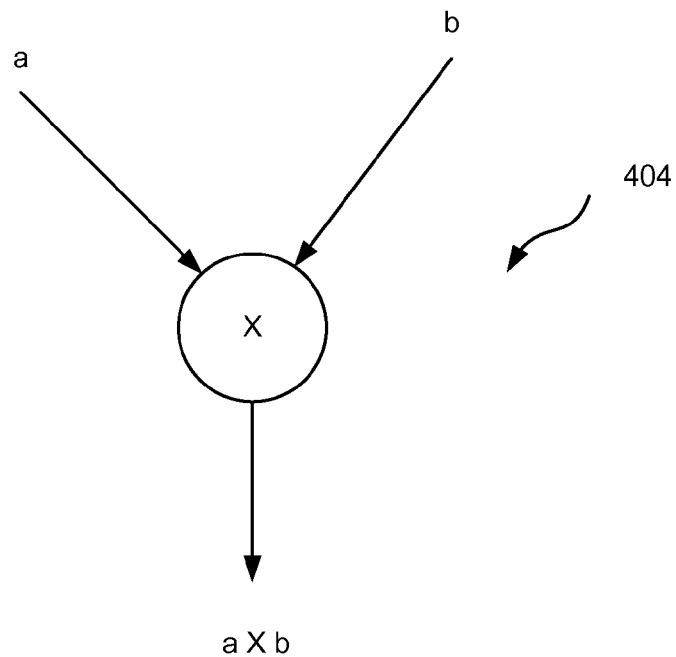
FIG. 4b is a schematic diagram of an example two-input floating point multiplier.
Figure 5:
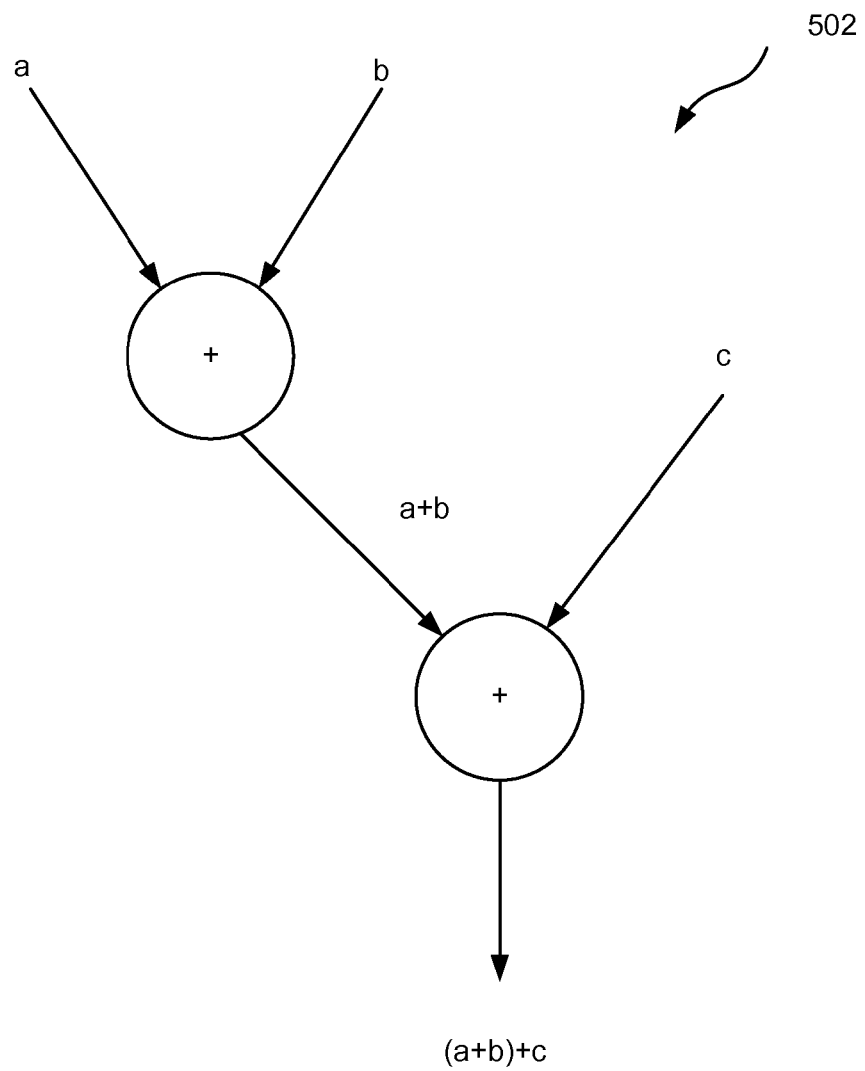
FIG. 5 is a schematic diagram of an example implementation of a three-input addition polynomial.

It is known that floating point computations of the form $a\hat{+}b$ or $a\hat{\times}b$ can be performed accurately (assuming no underflow or overflow occur). In particular, as shown in FIG. 4a, if $a\hat{+}b=0$ then it implies that $a+b=0$ and vice versa. Similarly, as shown in FIG. 4b, if $a\hat{\times}b=0$ then it implies that $a\times b=0$ and vice versa. Accordingly, it is assumed herein that only the floating point operations of two-input addition 402 and two-input multiplication 404 are available for the floating point implementation of a polynomial. For example, the polynomial $p=(a+b)+c$ may be implemented 502 as an addition of a+b and an addition of the output of a+b and c as shown in FIG. 5. The output of one operation or component that becomes the input of another operation or component is referred to herein as an intermediate signal. So in the example, the output of a+b would be considered an intermediate signal.

If tracing back a floating point implementation of a polynomial $\hat{p}$ when $\hat{p}=0$, there is a non-zero intermediate signal, X, which is the output of a non-trivial operator Y, and the inputs to Y can be altered without changing X and hence the entire implementation still returns zero, then it is possible to identify inputs such that $\hat{p}=0$ but that the infinitely precise $p \neq 0$.

For example, consider the polynomial $p=(a+b)+c$ which has a floating point implementation of $\hat{p}=(a\hat{+}b)\hat{+}c$, as shown in FIG. 5. If $c=1$, it can be seen that there are many floating-point numbers a and b whose output from a floating point adder ($\hat{+}$) is 1 but whose real sum is not 1. For example, if $a=0.1000\ldots000$ and $b=0.1000\ldots001$, $a\hat{+}b$ will be 1 resulting in $(a\hat{+}b)+c$ being 0. In another example, if $a=0.1000\ldots000$ and $b=0.11\ldots111$, the output of $(a\hat{+}b)\hat{+}c$ will be zero even though $(a+b)+c$ is not zero. Accordingly, there are cases where $\hat{p}$ will be zero even though p is not zero (i.e. $p \neq 0 = \hat{p}$). The polynomial p therefore does not have an allowable variety.

Accordingly, for a floating point implementation of a polynomial $\hat{p}$ to correctly calculate the zeros, when $\hat{p}=0$, all non-trivial operators within the implementation must produce zero. Since some of the non-trivial operators act on the inputs to the polynomial then certain inputs must have the property that $x_i=0$ or $x_j \pm x_k=0$. Accordingly if a polynomial can be represented as a union of constraints of the form $x_i=0$, or $x_j \pm x_k=0$ (as shown in equations (10)) the polynomial is considered to have an allowable variety. Otherwise the polynomial does not have an allowable variety.

$$p = \vee \wedge \{x_i \, op \, x_j = 0\}$$

$$op = \{+, -, \times\}$$

$$p = \vee \wedge \{x_i = 0, x_j \pm x_k = 0\} \quad (10)$$

In other words a polynomial has an allowable variety if the conditions for the polynomial being zero (i.e. equality) can be written in the form $x_i=0$ or $x_j \pm x_k=0$. Each zero condition (e.g. condition of the form $x_i=0$ or $x_j \pm x_k=0$)) defines a sub-variety.

For example, consider the Motzkin polynomial shown in equation (11):

$$z^6 + x^2 y^2 (x^2 + y^2 - 3z^2) \geq 0 \quad (11)$$

Equality (i.e. the polynomial is zero) occurs when $z=y=0$, or $z=x=0$, or $\pm z=\pm y=\pm x$. Accordingly, the Motzkin polynomial of equation (11) has an allowable variety since it satisfies the property shown in (10) above.

If a polynomial has an allowable variety then accurate evaluation of the polynomial using only floating point adder and multiplier components may be possible.

Partitioning the Input Domain into Sub-Domains

Once it has been determined that the polynomial has an allowable variety then the appropriate precision to accurately evaluate the polynomial for a given input is determined. Determining the appropriate precision comprises: (i) dividing the input domain around each of the sub-varieties of the allowable variety to determine which of the sub-varieties an input value is closest to; (ii) determining the precision to accurately evaluate the polynomial when the input is far from the closest sub-variety; and (iii) determining the precision to accurately evaluate the polynomial when the input is near the closest sub-variety. In general the closer the input is to one of the sub-varieties the more precision is required and the further the input is to the sub-varieties the less precision is required. Accordingly, the level of precision depends on the proximity of the input to the sub-varieties. As described above it is desirable to use increased precision only where is it is needed to achieve the desired relative error.

Since the level of precision depends on the proximity of the input to the sub-varieties, the first step is to determine which sub-variety an input is closest to. This is done by partitioning the input domain into sub-domains or regions which are each associated with a particular sub-variety. An input or point that falls within a particular sub-domain or region is closer to the associated sub-variety than any other sub-variety.

Partitioning is accomplished by mapping each sub-variety onto each possible plane formed by each possible pair of input values. Then on each plane constraints are generated that separate a given sub-variety from all the other sub-varieties.

This process is illustrated using the Motzkin polynomial of equation (11). As described above, the Motzkin polynomial has six sub-varieties: (i) $z=x=0$; (ii) $z=y=0$; (iii) $z=y=x$; (iv) $-z=y=x$; (v) $z=-y=x$; and (vi) $-z=-y=x$. These three sub-varieties can be represented by the six lines 602 to 612 shown in FIG. 6. In particular the first sub-variety $z=x=0$ is represented by the line 602, the second sub-variety $z=y=0$ is represented by the line 604, the third sub-variety $z=y=x$ is represented by the line 606, the fourth sub-variety $-z=y=x$ is represented by line 608, the fifth sub-variety $z=-y=x$ is represented by the line 610, and the sixth sub-variety $-z=-y=x$ is represented by the line 612.

Figure 6:
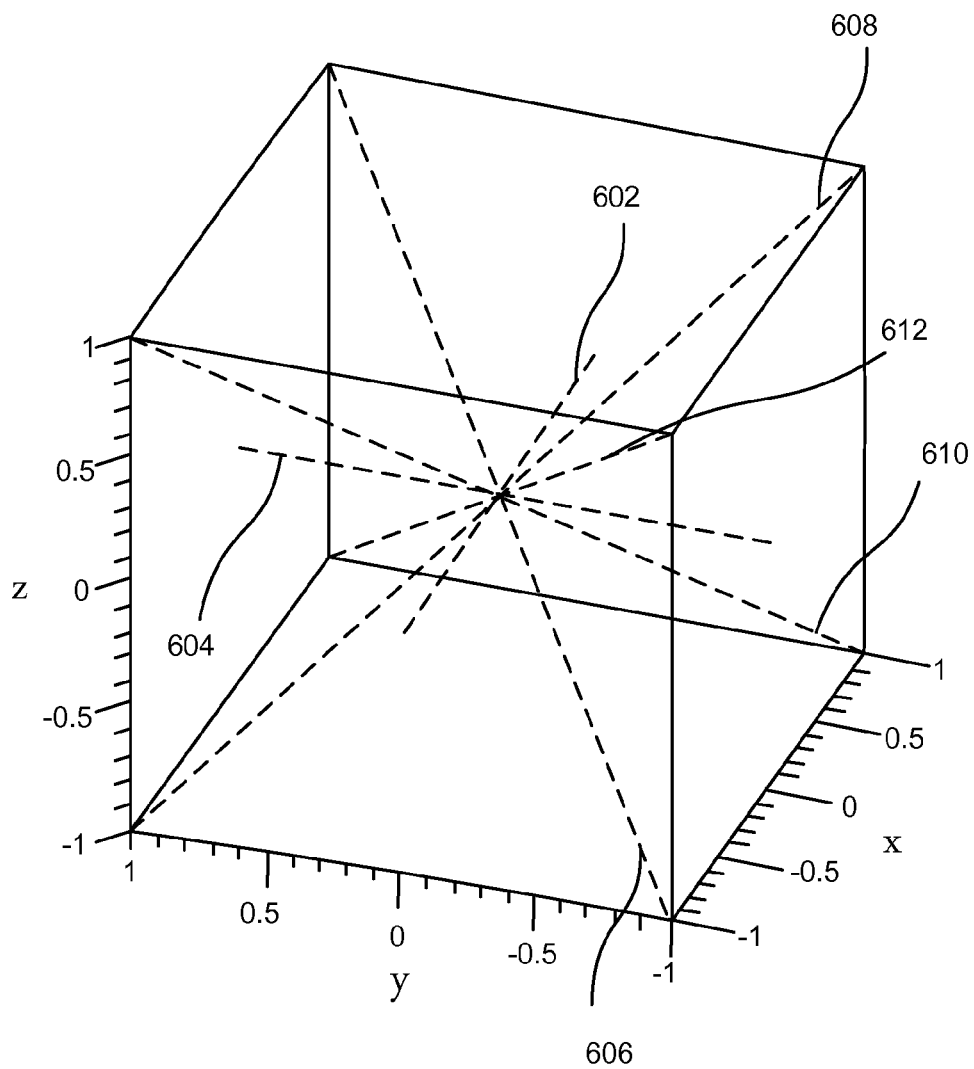
FIG. 6 is a graph of the sub-varieties of a Motzkin polynomial.
Figure 7A:
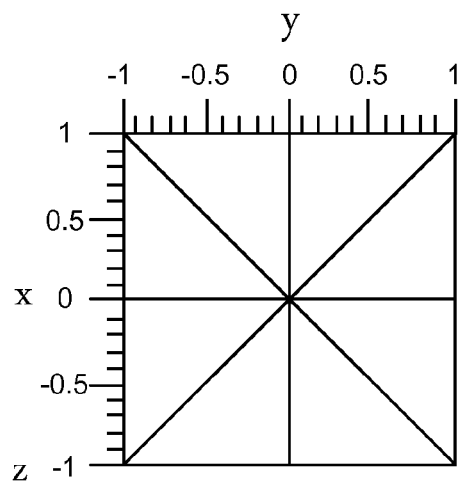
FIG. 7a is a graph of the sub-varieties of FIG. 6 mapped onto the xy plane.
Figure 7B:
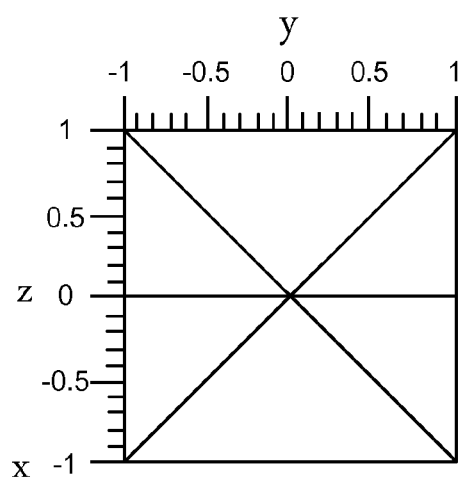
FIG. 7b is a graph of the sub-varieties of FIG. 6 mapped onto the zy plane.
Figure 7C:
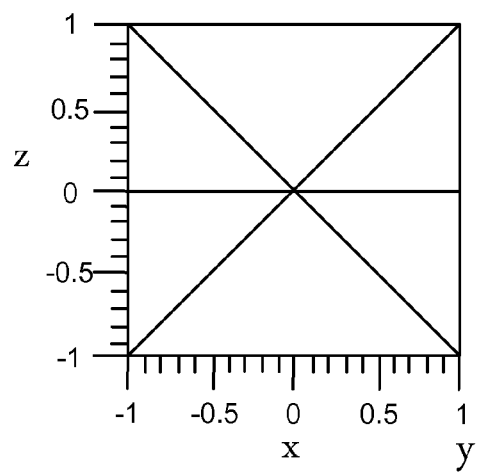
FIG. 7c is a graph of the sub-varieties of FIG. 6 mapped onto the zx plane.

Each line 606-612 in FIG. 6 is mapped onto each possible plane formed by each possible pair of input values. In this case there are three input values (x, y, z) thus there are three planes: (i) the xy plane; (ii) the yz plane; and (iii) the xz plane. FIG. 7a shows the sub-variety lines 602-612 of FIG. 6 mapped onto the xy plane, FIG. 7b shows the sub-variety lines 602-612 of FIG. 6 mapped onto the yz plane, and FIG. 7c shows the sub-variety lines 602-612 of FIG. 6 mapped onto the xz plane.

Constraints are generated for each sub-variety for each plane. The constraints define when a point on the plane (e.g. (x,y) in the xy plane) is closer to the sub-variety than any other sub-variety. This comprises defining a set of constraints for each line mapped to a particular plane that describes the condition for the arbitrary point to be closer to that line than any other line. For example, reference is made again to FIG. 7a. If point (x, y) is to be closest to line $x-y=0$ then it must be closer to $x-y=0$ than $x=0$, $y=0$ and $x+y=0$. This produces the following constraints shown in (12) which can be simplified as shown in (13):

$$|x-y| \leq |x| \quad |x-y| \leq |y| \quad |x-y| \leq |x+y| \quad (12)$$

$$|x-y| \leq |x| \quad |x-y| \leq |y| \quad sgn(x) = sgn(y) \quad (13)$$

The constraints determined from each plane are combined for each sub-variety to form a final set of constraints for the sub-variety. For example, the three planes (e.g. as shown in FIGS. 7a, 7b and 7c) together produce the constraints shown in (14) for the sub-variety=x. These constraints define the sub-domain or region for the sub-variety y=x.

$$|x-y| \leq |x| \quad |x-y| \leq |y| \quad |x-z| \leq |z| \quad |y-z| \leq |z| \quad sgn(x) = sgn(y) = sgn(z) \quad (14)$$

Similarly, the subdomain for the sub-variety $z=x=0$ is defined by the following constraints in (15):

$$|x| \leq |x-y| \quad |x| \leq |x+y| \quad |x| \leq |y| \quad |z| \leq |y-z| \quad |z| \leq |y+z| \quad (15)$$

Finally, the subdomain for the sub-variety $z=y=0$ is defined by the following constraints in (16):

$$\leq |y-x| \quad |y| \leq |y+x| \quad |y| \leq |x| \quad |z| \leq |x-z| \quad |z| \leq |x+z| \quad (16)$$

Since the Motzkin polynomial does not change when x, y or z are negative, it is sufficient to accurately evaluate the Motzkin polynomial in the positive octant, namely $x,y,z \geq 0$. In this octant the subdomain constraints of (14), (15) and (16) can be simplified to (17), (18) and (19) shown below respectively:

$$x \leq 2y \ y \leq 2x \ x \leq 2z \ y \leq 2z \quad (17)$$

$$2x \leq y \ 2z \leq y \quad (18)$$

$$2y \leq x \ 2z \leq x \quad (19)$$

In general the set of possible conditions which separate a sub-variety A from another sub-variety B when projected onto the x, y plane can be found in Table 2.

TABLE 2

| Part of Sub-Variety A | Part of Sub-Variety B | Resulting Constraint |
|---|---|---|
| x = y | x = y | Not needed |
| x = −y | x = −y | Not needed |
| x = y | x = −y | sgn(x) = sgn(y) |
| x = −y | x = y | sgn(x) ≠ sgn(y) |
| x = ±y | x = 0 | \|y\| ≤ \|2x\| |
| x = ±y | y = 0 | \|x\| ≤ \|2y\| |
| x = 0 | x = ±y | \|2x\| ≤ \|y\| |
| x = 0 | x = 0 | Not needed |
| x = 0 | y = 0 | \|x\| ≤ \|y\| |
| y = 0 | x = ±y | \|2y\| ≤ \|x\| |
| y = 0 | x = 0 | \|y\| ≤ \|x\| |
| y = 0 | y = 0 | Not needed |
| any | x = y = 0 | Not needed |
| x = y = 0 | any | Not needed |
| x,y plane | any | Not needed |
| any | x,y plane | Not needed |

Accordingly, the constraints in Table 1 can be used to generate the constraints defining the sub-domain for any sub-variety. As described above, if an input or point falls within a particular sub-domain it is closest to the sub-variety associated with the particular sub-domain.

Determining Precision when Far Away from the Sub-Variety

Once it has been determined what sub-variety (e.g. condition for when p=0) an input point is closest to, the floating point precision required to ensure a relative error of less than one can be determined. As noted above, the amount of precision required to achieve a particular bounded error is based on the distance the input is from the sub-variety. Generally, the closer the input is to a sub-variety the more precision is required, and the further the input is to a sub-variety the less precision is required.

Accordingly, for each sub-variety it is determined how far away from the sub-variety the input needs to be to use one or more predefined precisions. If the input is within the determined distance(s) then the associated precision can be used to accurately evaluate the polynomial using floating point components. If, however, the input is not within the determined distance(s) then the input is considered "close" to the sub-variety and a different method, described below, is used to determine if the polynomial can be accurately evaluated using floating point components and if so, the precision of those components.

A general polynomial can be represented by the form in equation (20)

$$p = \Sigma_\alpha c_\alpha x^\alpha \quad (20)$$

As described above, a basic floating point implementation of a polynomial is one which operates on the expanded form of the polynomial and first computes the monomials using a left to right logarithm multiplication tree, then multiples by each coefficient. Finally a left to right logarithmic addition tree is performed.

If the polynomial of equation (20) is homogenous (the sum of the exponents for each term in the polynomial is equal) of degree m with s terms, then the corresponding basic floating point implementation of the polynomial will be of the form shown in equation (21)

$$\hat{p}_{basic} = \Sigma_\alpha c_\alpha x^\alpha \Pi_{i=1}^{m+\lceil \log_2 s \rceil}(1+\delta_{\alpha,i}) \quad (21)$$

where each floating point operation (e.g. $\hat{\times}$, $\hat{-}$, $\hat{+}$) introduces a relative error $(1+\delta_i)$ where $|\delta_i| \leq \delta$ where $\delta$ is the largest relative error the floating point components can introduce.

The relative error of $\hat{p}_{basic}$ top can then be represented by equation (22)

$$\left| \frac{\hat{p}_{basic} - p}{p} \right| = \left| \frac{\Sigma_\alpha c_\alpha x^\alpha (\Pi_{i=1}^{m+\lceil \log_2 s \rceil}(1+\delta_{\alpha,i}) - 1)}{\Sigma_\alpha c_\alpha x^\alpha} \right| \quad (22)$$

If the polynomial is homogenous (as noted) above then $p(\Delta x) = \Delta^m p(x)$. Accordingly scaling every variable $x_i$ by the same amount will leave the relative error of $\hat{p}_{basic}$ to p unchanged. Therefore, without a loss of generality, it can be assumed that a bound can be calculated by assuming evaluation on the unit sphere, namely $\|x\| = \sqrt{\Sigma_i x_i^2} = 1$. This means that it can be assumed that $|x_i| \leq 1$. Furthermore, since the evaluation is done "far" from the variety then $p \neq 0$. Thus the relative error can be bounded as shown in equation (23):

$$\left| \frac{\hat{p}_{basic} - p}{p} \right| \leq \left| \frac{\Sigma_\alpha |c_\alpha|((1+\delta)^{m+\lceil \log_2 s \rceil} - 1)}{p_{min}} \right| \quad (23)$$

where $p_{min}$ is the smallest value of p obtainable when $\|x\| = 1$ and in domain D. $p_{min}$ can be represented by equation (24):

$$p_{min} = \min(p(x) : \|x\| = 1, x \in D) \quad (24)$$

Accordingly, the polynomial of equation (20) can be accurately evaluated using a basic floating point implementation with floating point components with a maximum relative accuracy $\delta$ on the domain D provided equation (25) is true:

$$\frac{\Sigma_\alpha |c_\alpha|((1+\delta)^{m+\lceil \log_2 s \rceil} - 1)}{\min(p(x) : \|x\| = 1, x \in D)} < \eta \quad (25)$$

and provided D is in a sub-domain, but does not include any part of the corresponding sub-variety (e.g. it is bounded away from the sub-variety itself).

As described above, a sub-domain can be written as the intersection of constraints of the following form shown in (26):

$$|x_i| \leq |2x_j| \ |2x_i| \leq |x_j| \ sgn(x_i) = sgn(x_j) sgn(x_i) \neq sgn(x_j) \quad (26)$$

A constrain for bounding away from a particular sub-variety will be of one of the following formats shown in (27):

$$x_i^2 \geq e^2(x_1^2 + x_2^2 + \ldots + x_n^2) \text{ or } (x_i - x_j)^2 \geq e^2(x_1^2 + x_2^2 + \ldots + x_n^2) \quad (27)$$

Accordingly equation (25) is met when the following conditions (28), (29) and (30) are true:

$$\frac{\sum_\alpha |c_\alpha|((1+\delta)^{m+\lceil \log_2 s \rceil} - 1)}{\eta} < p \quad (28)$$

$$x_1^2 + x_2^2 + \ldots + x_n^2 = 1 \quad (29)$$

$$x \in D \quad (30)$$

In particular, if conditions (28), (29) and (30) are met then a basic floating point implementation of a polynomial p using floating point components with a bounded relative error of $\delta$ will have a relative error bounded by $\eta$.

Accordingly, if e (distance from the sub-variety) is fixed, $\delta$ (precision) is maximized whereas if $\delta$ (precision) is fixed then e (distance from the sub-variety) is minimized. Ideally the minimum e that allows for a specific $\delta$ is selected.

The Motzkin polynomial of equation (11) can be used to demonstrate use of equation (25) to identify the e for the sub-variety x=y=z for a floating point implementation of a polynomial using floating point components with a relative accuracy of $2^{-23}$ (F32 components) to guarantee a relative accuracy of $2^{-10}$. In particular from equation (25) the result is equation (31).

$$\min_{e>0}\left(\frac{6((1+2^{-23})^8 - 1)}{\min\left(\begin{array}{c} p(x):\|x\|=1, x, y, z \geq 0, x \leq 2y, y \leq 2x, x \leq 2z, y \leq 2z, \\ ((x-z)^2 \geq e^2(x^2+y^2+z^2)) \text{ or} \\ (y-z)^2 \geq e^2(x^2+y^2+z^2) \end{array}\right)}\right) \quad (31)$$

The minimization of e is an exercise in polynomial minimization which can be performed, for example, via Gröbner bases. Similar minimisations can be performed for each sub-variety and for single or double floating point components to identify e values for each sub-variety for each single and double floating point components. A summary of the e values for the Motzkin polynomial of equation (11) is summarized in Table 3.

TABLE 3

| Sub-Variety | F32 (Single) | F64 (Double) |
| --- | --- | --- |
| x = y = z | $e_1 = 4860985 \times 2^{-25}$ ≈ 0.1448686421 | $e_2 = 12582933 \times 2^{-41}$ ≈ 0.000005722055448 |
| z = x = 0 | $e_3 = 14247057 \times 2^{-25}$ ≈ 0.4245953858 | $e_4 = 14529599 \times 2^{-42}$ ≈ 0.000003303648327 |
| z = y = 0 | $e_3 = 14247057 \times 2^{-25}$ ≈ 0.4245953858 | $e_4 = 14529599 \times 2^{-42}$ ≈ 0.000003303648327 |

This means that when the input falls in any of the following domains D then the polynomial can be accurately evaluated using a floating point implementation using single floating point components (F32), $D_1$=subdomain$_{subvariety:x=y=z}$ and $(x-z)^2 \geq e_1^2(x^2+y^2+z^2)$ or $(y-z)^2 \geq e_1^2(x^2+y^2+z^2)$ $D_2$=subdomain$_{subvariety:x=z=0}$ and $x^2 \geq e_3^2(x^2+y^2+z^2)$ or $z^2 \geq e_3^2(x^2+y^2+z^2)$ $D_3$=subdomain$_{subvariety:y=z=0}$ and $y^2 \geq e_3^2(x^2+y^2+z^2)$ or $z^2 \geq e_3^2(x^2+y^2+z^2)$ and if the input falls in any of the following domains D then the polynomial can be accurately evaluated using a floating point implementation using double floating point components (F64)

$D_4$=subdomain$_{subvariety:x=y=z}$ and $(x-z)^2 \geq e_2^2(x^2+y^2+z^2)$ or $(y-z)^2 \geq e_2^2(x^2+y^2+z^2)$ $D_5$=subdomain$_{subvariety:x=z=0}$ and $x^2 \geq e_4^2(x^2+y^2+z^2)$ or $z^2 \geq e_4^2(x^2+y^2+z^2)$ $D_6$=subdomain$_{subvariety:y=z=0}$ and $y^2 \geq e_4^2(x^2+y^2+z^2)$ or $z^2 \geq e_4^2(x^2+y^2+z^2)$ There are, however, regions of the input domain to the Motzkin polynomial that do not fall into any of the sub-domains (i.e. the sub-domain for the sub-variety x=y=z; the sub-domain for the sub-variety x=z=0; and the sub-domain for the sub-variety y=z=0). The only point on the variety that resides in these regions is the origin x=y=z=0. Close to the origin, but in regions not covered by the sub-domains, a parameter $e_5$ can be chosen to permit single floating point components (F32) to be used, provided one of the following conditions in equation (32) hold:

$$x \geq e_5^2(x^2+y^2+z^2) \text{ or } y \geq e_5^2(x^2+y^2+z^2) \text{ or } z \geq e(x^2+y^2+z^2) \quad (32)$$

Similarly $e_6$ can be calculated to permit double floating point components (F64). These are calculated to be as follows:

$$e_5 = 2053059 \times 2^{-21} \approx 0.9789748192$$

$$e_6 = 15817739 \times 2^{-24} \approx 0.9428107142$$

Generally as e gets smaller more precision is required. However, at some point e gets so small (e.g. the point gets so close to zero) that very accurate precision is required. This is because as you approach the sub-variety, terms of the polynomial that were irrelevant become relevant and dominant. The determination of the appropriate terms to be evaluated and floating point accuracy thereof in these cases is discussed below.

Determining Precision when Close to the Sub-Variety

When the input point or value is close to a sub-variety whether or not a polynomial can be accurately evaluated and if so, what precision is required, is based on the particular direction of approach to the sub-variety. In particular, if the sub-variety is approached from one direction a particular term may become relevant or dominant whereas if the sub-variety is approached from a different direction a different term may become relevant or dominant.

For example, consider the polynomial in equation (33)

$$p = x^2 a + xyb + y^2 \quad (33)$$

If the sub-variety x=y=0 is approached from a direction characterized by x=y=t the polynomial of equation (33) can be written in terms of variable t as shown in equation (34):

$$p = t^2(a+b+c) \quad (34)$$

It can be seen that in this scenario a+b+c becomes the dominant term. Thus, to accurately evaluate the polynomial of equation (34) near x=y=0 it must be possible to accurately evaluate a+b+c. This is not possible since a+b+c is does not have an allowable variety.

To determine the dominant terms of a polynomial as the input approaches a particular sub-variety, the polynomial is expanded using the variables defining the sub-variety within a given sub-domain. The dominant terms are then identified by computing the terms associated with the faces of the convex hull of a multi-dimensional Newton polytope.

An example of identifying the dominant terms in this manner will be described using the Motzkin polynomial of equation (11). To determine the dominant terms of the polynomial as the sub-variety x=y=z is approached, the polynomial is re-written in terms of a=x−z and b=y−z to produce the polynomial p(z,a,b) shown in equation (35):

$$p(z,a,b)=4z^4a^2+4z^4ab+4z^4b^2+4z^3a^3+10z^3a^2b+10z^3ab^2+\\4z^3b^3+z^2a^4+8z^2a^3b+9z^2a^2b^2+8z^2ab^3+z^2b^4+\\2za^4b+4za^3b^2+4za^2b^3+2zab^4+a^4b^2+a^2b^4 \quad (35)$$

Figure 8:
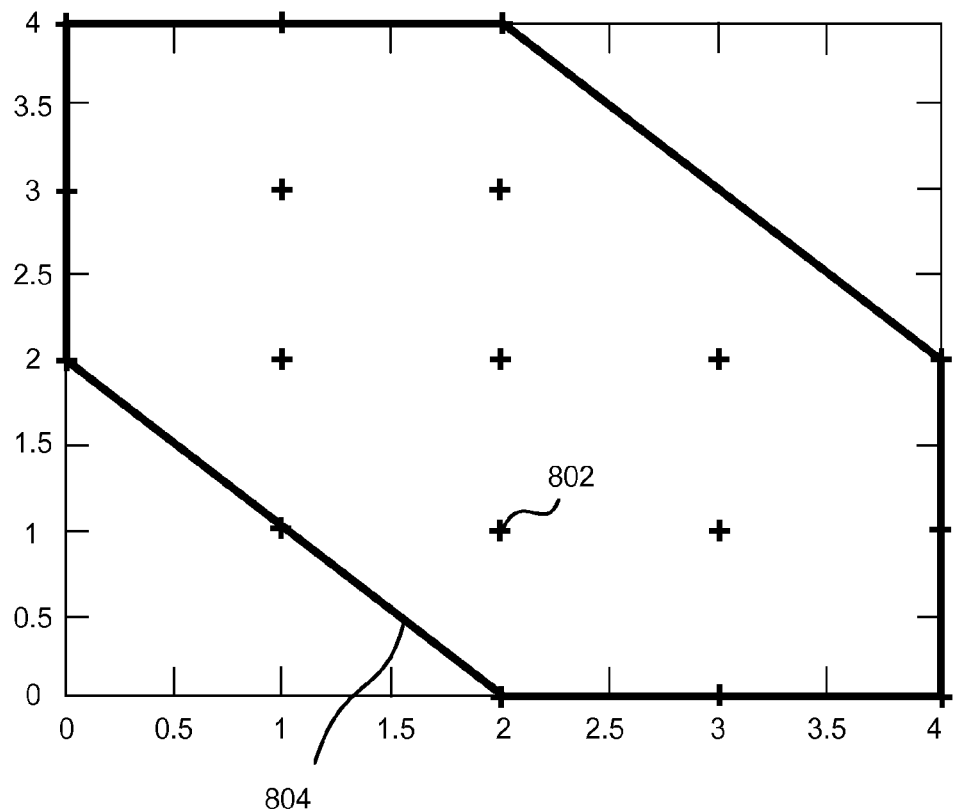
FIG. 8 is a graph of the terms of a polynomial.

To determine the terms that dominate in p(z, a, b) as a,b→0, each of the points (i, j) where a term of the form $a^ib^j$ exists in p(z, a, b) is plotted. The points (i, j) 802 for equation (35) are shown in FIG. 8. The convex hull 804 of these points is then determined. The dominant terms are the terms associated with the face of the convex hull nearest the origin.

For example, the term $4z^4ab$ will tend to zero slower than $9z^2a^2b^2$ as a and b approach zero. Hence $4z^4ab$ dominates $9z^2a^2b^2$. Similarly, the set of terms associated with the face nearest the origin dominate all others. It can be seen from FIG. 8 and equation (35) that the dominant terms are as shown in equation (36):

$$p_{dom}=4z^4a^2+4z^4ab+4z^4b^2 \quad (36)$$

Once the dominant terms have been identified it is determined whether the polynomial they form has an allowable variety (i.e. are the zeros of the form $x_i=0$ or $x_j\pm x_k=0$) and thus can be accurately evaluated. In the example of the Motzkin polynomial the zeros (i.e. sub-varieties) of the polynomial of the dominant terms ($p_{dom}$) are z=0 and a=b=0 thus the dominant terms have an allowable variety.

If the polynomial formed of the dominant terms has an allowable variety then the polynomial may be accurately evaluated. If, however, the polynomial formed of dominant terms is to act as a proxy for the polynomial near x=y=z then the basic floating point implementation of the dominant polynomial ($\hat{p}_{dom(basic)}$) has its own error which can be bounded as shown in equation (37):

$$\left|\frac{\hat{p}_{dom(basic)}-p}{p}\right| \le \left|\frac{\hat{p}_{dom(basic)}-p_{dom}}{p_{dom}}\right|\left|\frac{p_{dom}}{p}\right|+\left|\frac{p_{dom}-p}{p}\right| \quad (37)$$

If the following can be determined:

$$\Delta=\max\left|\frac{p_{dom}-p}{p}\right| \quad (38)$$

then equation (37) can be written in terms of Δ as shown in equation (39) and must be less than the global relative error $$\left|\frac{\hat{p}_{dom(basic)}-p}{p}\right| \le \left|\frac{\hat{p}_{dom(basic)}-p_{dom}}{p_{dom}}\right|(1+\Delta)+\Delta<\eta \quad (39)$$

Equation (39) can be rearranged to equation (40):

$$\left|\frac{\hat{p}_{dom(basic)}-p_{dom}}{p_{dom}}\right|<\frac{\eta-\Delta}{1+\Delta} \quad (40)$$

From equation (40) it is clear that if $p_{dom}$ can be implemented with relative accuracy bounded above $\eta-\Delta/1+\Delta$ then $\hat{p}_{dom(basic)}$ can be used as the accurate evaluation of p near x=y=z. From the previous section it is known that a basic floating point implementation of a polynomial is relatively accurate if the condition in equation (25) is satisfied. Accordingly, equation (40) can be re-written as equation (41):

$$\frac{\sum_\alpha |c_\alpha|((1+\delta)^{m+\lceil \log_2 s\rceil}-1)}{\min(p(x):\|x\|=1,x\in D)}<\frac{\eta-\Delta}{1+\Delta} \quad (41)$$

If η is known and Δ can be determined then equation (41) can be solved to determine δ which indicates the level of precision needed to accurately evaluate the polynomial (via the dominant term polynomial) when it gets close to a particular sub-variety.

Reference is now made back to the Motzkin polynomial of equation (11). The dominant polynomial $p_{dom}$ for this polynomial as it approaches the sub variety x=y=z is shown in equation (36). The value of Δ is calculated to be 6356645/$2^{39}$≈0.00001156266990. The calculation of $p_{min}$ just off the sub variety returns a minimum value of 70368744177664/1990303912851459264513. Therefore a basic implementation of $p_{dom}$ must use components that satisfy equation (42):

$$\frac{\frac{12((1+\Delta)^{10}-1)}{70368744177664}}{1990303912851459264513}<\frac{\eta-\Delta}{1+\Delta}\approx 0.0009649886723 \quad (42)$$

The largest value of δ which satisfies this is $2^{-42}$ so F64 operations can be used.

For the other sub-varieties $p_{dom}=z^6+x^2+y^4$, the associated $$\Delta=\frac{1512937}{2^{32}} \text{ and } p_{min}=\frac{8413227}{2^{147}}.$$

Therefore a basic implementation of this $p_{dom}$ must use components that satisfy equation (43):

$$\frac{2((1+\delta)^6-1)}{\frac{8413227}{2^{147}}}<\frac{\eta-\Delta}{1+\Delta} \quad (43)$$

The largest value of δ which satisfies this is $2^{-139}$.

In the regions not covered by the sub-domains, as the origin is approached, all terms are dominant because p is homogenous. For this region $$p_{min}=\frac{236}{75}-\frac{32\sqrt{6}}{25}\approx 0.011319796.$$

A basic implementation of p in this domain requires floating point operations with a precision that satisfies equation (44):

$$\frac{6((1+\delta)^8-1)}{\frac{236}{75}-\frac{32\sqrt{6}}{25}}<2^{-10} \quad (44)$$

The largest value of S which satisfies this is $2^{-23}$.

Example Implementation for Motzkin Polynomial

The output from each of the previous steps is combined to form an implementation of the polynomial which allows accurate evaluation thereof.

The following is an example of an algorithm of an implementation of the Motzkin polynomial of (11) generated using the method described above which accurately evaluates the Motzkin polynomial. The function BasicN(p) implements a basic implementation using floating-point operators of size N∈{32,64}. An example is illustrated in equation (45)

$$\text{Basic}N(3x^2+2x^2y+3xy^2)=(3((xx)x)+2((xx)y))+3((xy)y) \quad (45)$$

Basic128$^+$(p) is an extended quad precision with a mantissa of length 139.

In addition, where the comparisons to determine whether an input is within a sub-domain are being performed using single floating point precision (F32) then the e values should be rounded up to the nearest F32 value to ensure no false positive occurs. This results in the following modified e values.

$$e_1 = \frac{11267275}{2^{29}}$$

$$e_2 = \frac{9437221}{2^{58}}$$

$$e_3 = \frac{12098473}{2^{26}}$$

$$e_4 = \frac{12583095}{2^{60}}$$

$$e_5 = \frac{16079149}{2^{24}}$$

$$e_6 = \frac{7456569}{2^{23}}$$

```
Inputs
F16 x, y, z;
Output
F32 ρ̂
F32 x = |x|
F32 y = |y|
F32 z = |z|
F32 x2 = x²
F32 y2 = y²
F32 z2 = z²
F32 a = x - z
F32 b = y - z
F32 c = x - y
F32 a2 = a²
F32 b2 = b²
F32 s = (x2 + y2) + z2
```

$$F32 \; e_1 = \frac{11267275}{2^{29}}$$

$$F32 \; e_2 = \frac{9437221}{2^{58}}$$

$$F32 \; e_3 = \frac{12098473}{2^{26}}$$

$$F32 \; e_4 = \frac{12583095}{2^{60}}$$

$$F32 \; e_5 = \frac{16079149}{2^{24}}$$

$$F32 \; e_6 = \frac{7456569}{2^{23}}$$

```
if(x ≤ 2y,y ≤ 2x,x ≤ 2z,y ≤ 2z){ //near the line x = y = z
    if(a2 ≥ e₁s || b2 ≥ e₁s) // far enough from the variety for F32
        ρ̂ = Basic32(z⁶ + x⁴y² + x²y⁴ - 3x²y²z²);
    elsif(a2 ≥ e₂s || b2 ≥ e₂s) // far enough from the variety for F32
        ρ̂ = Basic64(z⁶ + x⁴y² + x²y⁴ - 3x²y²z²);
    else // close to the sub-variety
        ρ̂ = Basic64(4z⁴a² + 4z⁴ab + 4z⁴b²);
}
elsif(2x ≤ y,2z ≤ y){ //near the line x = z = 0
    if(x2 ≥ e₃s || z2 ≥ e₃s) // far enough from the variety for F32
        ρ̂ = Basic32(z⁶ + x⁴y² + x²y⁴ - 3x²y²z²);
    elsif(x2 ≥ e₄s || z2 ≥ e₄s) // far enough from the variety for F32
        ρ̂ = Basic64(z⁶ + x⁴y² + x²y⁴ - 3x²y²z²);
    else // close to the sub-variety
        ρ̂ = Basic128⁺(z⁶ + x²y⁴);
}
elsif(2y ≤ x,2z ≤ x){ //near the line y = z = 0
    if(y2 ≥ e₃s || z2 ≥ e₃s) // far enough from the variety for F32
        ρ̂ = Basic32(z⁶ + x⁴y² + x²y⁴ - 3x²y²z²);
    elsif(y2 ≥ e₄s || z2 ≥ e₄s) // far enough from the variety for F32
        ρ̂ = Basic64(z⁶ + x⁴y² + x²y⁴ - 3x²y²z²);
    else // close to the sub-variety
        ρ̂ = Basic128⁺(z⁶ + y²x⁴);
}
else { //near no part of the variety
    if(x2 ≥ e₅s || y2 ≥ e₅s || z2 ≥ e₅s) // far enough from the variety for F32
        ρ̂ = Basic32(z⁶ + x⁴y² + x²y⁴ - 3x²y²z²);
    elsif(x2 ≥ e₆s || y2 ≥ e₆s || z2 ≥ e₆s) // far enough from the variety for F32
        ρ̂ = Basic64(z⁶ + x⁴y² + x²y⁴ - 3x²y²z²);
    else //
        ρ̂ = Basic32(z⁶ + x⁴y² + x²y⁴ - 3x²y²z²);
}
```

Although the above examples have been described in relation to homogeneous polynomials it will be evident to a person of skill in the art that the principles and methods described herein may be equally applied to non-homogeneous polynomials as non-homogeneous polynomials can be converted into homogenous polynomials. In particular, an arbitrary polynomial p can be homogenized by evaluating polynomial q as shown in equation (46) which has an extra variable $x_0$ setting $x_0=1$ where (d is the largest total degree of p):

$$q(x_0, x_1, x_2, \ldots, x_n) = x_0^d p\left(\frac{x_1}{x_0}, \frac{x_2}{x_0}, \ldots, \frac{x_n}{x_0}\right) \quad (46)$$

Equation (47) shows that q is in fact homogeneous:

$$q(\lambda x_0, \lambda x_1, \lambda x_2, \ldots, \lambda x_n) = (\lambda x_0)^d p\left(\frac{\lambda x_1}{\lambda x_0}, \frac{\lambda x_2}{\lambda x_0}, \ldots, \frac{\lambda x_n}{\lambda x_0}\right) = \lambda^d q \quad (47)$$

Figure 9:
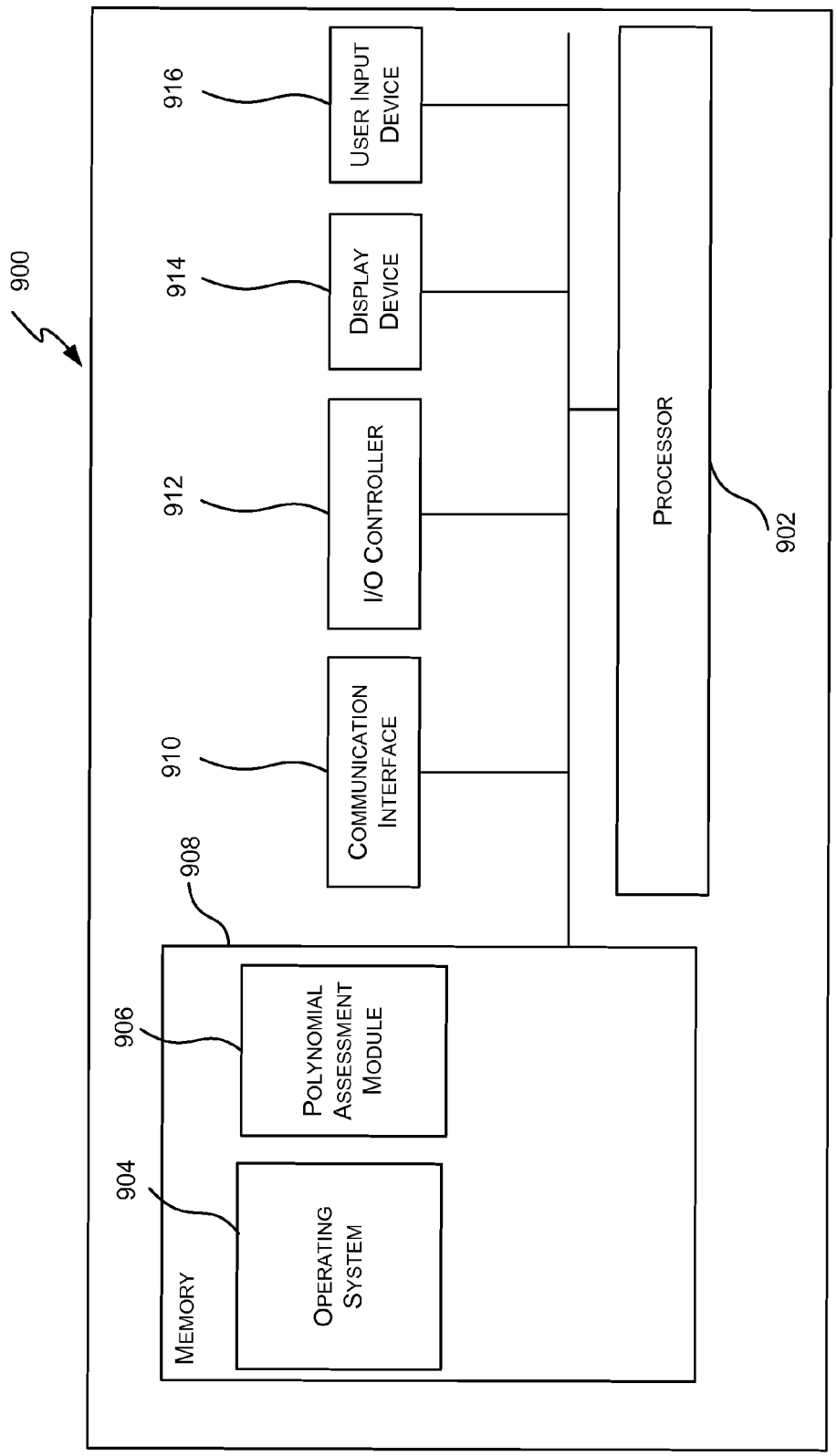
FIG. 9 is a block diagram of an exemplary computing-based device.

Reference is now FIG. 9 which illustrates various components of an exemplary computing-based device 900 which may be implemented as any form of a computing and/or electronic device, and in which the methods and systems described herein may be implemented.

Computing-based device 900 comprises one or more processors 902 which may be microprocessors, controllers or any other suitable type of processors for processing computer executable instructions to control the operation of the device in order to identify a floating point implementation of a polynomial that allows accurate evaluation of the polynomial. In some examples, for example where a system on a chip architecture is used, the processors 902 may include one or more fixed function blocks (also referred to as accelerators) which implement a part of the method of FIG. 3 in hardware (rather than software or firmware). Platform software comprising an operating system 904 or any other suitable platform software may be provided at the computing-based device to enable application software 906 to be executed on the device.

The computer executable instructions may be provided using any computer-readable media that is accessible by computing based device 900. Computer-readable media may include, for example, computer storage media such as memory 908 and communications media. Computer storage media (i.e. non-transitory machine readable media), such as memory 908, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 908) is shown within the computing-based device 900 it will be appreciated that the storage may be distributed or located remotely and accessed via a network or other communication link (e.g. using communication interface 910).

The computing-based device 900 also comprises an input/output controller 912 arranged to output display information to a display device 914 which may be separate from or integral to the computing-based device 900. The display information may provide a graphical user interface. The input/output controller 912 is also arranged to receive and process input from one or more devices, such as a user input device 916 (e.g. a mouse or a keyboard). This user input may be used to provide the inputs to the polynomial assessment module 906. In an embodiment the display device 914 may also act as the user input device 916 if it is a touch sensitive display device. The input/output controller 912 may also output data to devices other than the display device, e.g. a locally connected printing device (not shown in FIG. 9).

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), radio processing units (RPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a processing unit configured to perform any of the methods described herein, or for generating a processing unit comprising any apparatus described herein. That is, a computer system may be configured to generate a representation of a digital circuit from definitions of circuit elements and data defining rules for combining those circuit elements, wherein a non-transitory computer readable storage medium may have stored thereon processor executable instructions that when executed at such a computer system, cause the computer system to generate a processing unit as described herein. For example, a non-transitory computer readable storage medium may have stored thereon computer readable instructions that, when processed at a computer system for generating a manifestation of an integrated circuit, cause the computer system to generate a manifestation of a processor of a receiver as described in the examples herein or to generate a manifestation of a processor configured to perform a method as described in the examples herein. The manifestation of a processor could be the processor itself, or a representation of the processor (e.g. a mask) which can be used to generate the processor.

Memories storing machine executable data for use in implementing disclosed aspects can be non-transitory media. Non-transitory media can be volatile or non-volatile.

Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of generating a floating point implementation of a polynomial in hardware logic, the method comprising:
   determining, in an assessment module, whether the polynomial has an allowable variety defined by one or more sub-varieties;
   in response to determining that the polynomial has an allowable variety, partitioning, in an assessment module, an input domain of the polynomial into a plurality of sub-domains about the plurality of sub-varieties, each sub-domain being associated with one of the plurality of sub-varieties;
   for each sub-domain, identifying, in an assessment module, a precision of floating point components for each input to the polynomial falling within that sub-domain based on a location of the input within that sub-domain; and
   generating a floating point implementation comprising hardware logic configured to evaluate the polynomial for any received input to the polynomial using floating point components having the precision identified for the input.

2. The method of claim 1, wherein determining whether the polynomial has an allowable variety comprises determining whether each of the conditions for the polynomial being zero are of the form $x_i=0$ or $x_j\pm_k=0$.

3. The method of claim 1, wherein partitioning the input domain into one or more sub-domains about the plurality of sub-varieties comprises mapping, in an assessment module, each sub-variety onto each plane formed by each possible pair of input values, and, for each plane, creating constraints for each sub-variety that separate that sub-variety from the other sub-varieties.

4. The method of claim 3, wherein a sub-domain is defined as an intersection of the constraints for an associated sub-variety.

5. The method of claim 4, wherein the constraints for a sub-variety are created by considering, in an assessment module, whether an input to the polynomial is closer to the sub-variety than the other sub-varieties.

6. The method of claim 1, wherein identifying the precision of floating point components for each input to the polynomial falling in a particular sub-domain comprises identifying, in an assessment module, a subset of the sub-domain that is capable of being accurately evaluated using a basic floating point implementation of the polynomial of a predefined precision.

7. The method of claim 6, wherein identifying the precision of floating point components for each input to the polynomial falling within a particular sub-domain and outside of the identified subset of the particular sub-domain, further comprises:
   identifying, in an assessment module, one or more dominant terms of the polynomial as the polynomial approaches the sub-variety;
   generating, in an assessment module, a dominant term polynomial comprising the one or more identified dominant terms;
   determining, in an assessment module, whether the dominant term polynomial has an allowable variety; and
   in response to determining that the dominant term polynomial has an allowable variety, determining, in an assessment module, a floating point precision to accurately evaluate the polynomial using the dominant term polynomial.

8. The method of claim 7, wherein identifying the one or more dominant terms of the polynomial as the polynomial approaches the sub-variety comprises: expanding, in an assessment module, the polynomial using variables defining the sub-variety; and identifying, in an assessment module, the dominant terms as the terms of the expanded polynomial associated with faces of a convex hull of a multi-dimensional Newton polytope.

9. The method of claim 7, wherein determining whether the dominant term polynomial has an allowable variety comprises determining, in an assessment module, whether each of the conditions for the dominant term polynomial being zero are of the form $x_i=0$ or $x_j \pm x_k=0$.

10. A system to generate a floating point implementation of a polynomial in hardware logic, the system comprising:
an input module configured to receive the polynomial;
an assessment module configured to:
determine whether the polynomial has an allowable variety defined by a plurality of sub-varieties;
in response to determining that the polynomial has an allowable variety, partition an input domain of the polynomial into a plurality of sub-domains about the plurality of sub-varieties, each sub-domain being associated with one of the plurality of sub-varieties; and
identify a precision of floating point components for each input to the polynomial falling in each sub-domain based on a location of the input within the sub-domain; and
an output module configured to output a floating point implementation comprising hardware logic configured to evaluate the polynomial for an input to the polynomial using floating point components having the precision identified for the input.

11. The system of claim 10, wherein determining whether the polynomial has an allowable variety comprises determining, in the assessment module, whether each of the conditions for the polynomial being zero are of the form $x_i=0$ or $x_j \pm x_k=0$.

12. The system of claim 10, wherein partitioning the input domain into one or more sub-domains about the plurality of sub-varieties comprises mapping, in the assessment module, each sub-variety onto each plane formed by each pair of input values, and, for each plane, creating constraints for each sub-variety that separate that sub-variety from the other sub-varieties.

13. The system of claim 12, wherein a sub-domain is defined as an intersection of the constraints for an associated sub-variety.

14. The system of claim 13, wherein the constraints for a sub-variety are created by considering, in the assessment module, whether an input to the polynomial is closer to the sub-variety than the other sub-varieties.

15. The system of claim 10, wherein identifying the precision of floating point components for each input to the polynomial falling in a particular sub-domain comprises identifying, in the assessment module, a subset of the sub-domain that is capable of being accurately evaluated using a basic floating point implementation of the polynomial of a predefined precision.

16. The system of claim 15, wherein identifying the precision of floating point components for each input to the polynomial falling within a particular sub-domain and outside the identified subset of the sub-domain comprises:
identifying, in the assessment module, one or more dominant terms of the polynomial as the polynomial approaches the sub-variety associated with the sub-domain;
generating, in the assessment module, a dominant term polynomial comprising the one or more identified dominant terms;
determining, in the assessment module, whether the dominant term polynomial has an allowable variety; and
in response to determining that the dominant term polynomial has an allowable variety, identifying, in the assessment module, a floating point precision to accurately evaluate the polynomial using the dominant term polynomial.

17. The system of claim 16, wherein identifying the one or more dominant terms of the polynomial as the polynomial approaches the sub-variety comprises: expanding, in the assessment module, the polynomial using variables defining the sub-variety; and identifying the dominant terms as the terms of the expanded polynomial associated with faces of a convex hull of a multi-dimensional Newton polytope.

18. The system of claim 16, wherein determining whether the dominant term polynomial has an allowable variety comprises determining, in the assessment module, whether each of the conditions for the dominant term polynomial being zero are of the form $x_i=0$ or $x_j \pm x_k=0$.

19. A non-transitory computer readable storage medium having stored thereon computer readable program code that when executed causes at least one processor to:
determine, in the processor, whether a polynomial has an allowable variety defined by one or more sub-varieties;
in response to determining that the polynomial has an allowable variety, partition, in the processor, an input domain of the polynomial into a plurality of sub-domains about the plurality of sub-varieties, each sub-domain being associated with one of the plurality of sub-varieties;
for each sub-domain, identify, in the processor, a precision of floating point components for each input to the polynomial falling in each sub-domain based on a location of the input within the sub-domain; and
generate, in the processor, a floating point implementation comprising hardware logic configured to evaluate the polynomial for an input to the polynomial using floating point components having the precision identified for the input.

* * * * *